No. 799,535. PATENTED SEPT. 12, 1905.
W. H. COE.
MACHINE FOR DEPOSITING METALLIC LEAF IN RIGHT LINES.
APPLICATION FILED JULY 18, 1904.

8 SHEETS—SHEET 1.

WITNESSES
A.G. Pieczentkowski.
Andrew J Pitcher

INVENTOR
Walter H. Coe.
BY
S. Scholfield
ATTORNEY

No. 799,535. PATENTED SEPT. 12, 1905.
W. H. COE.
MACHINE FOR DEPOSITING METALLIC LEAF IN RIGHT LINES.
APPLICATION FILED JULY 18, 1904.

8 SHEETS—SHEET 2.

WITNESSES
A.G. Pieczentkowski.
Andrew J. Pitcher

INVENTOR
Walter H. Coe
By S. Scholfield
ATTORNEY

No. 799,535. PATENTED SEPT. 12, 1905.
W. H. COE.
MACHINE FOR DEPOSITING METALLIC LEAF IN RIGHT LINES.
APPLICATION FILED JULY 18, 1904.
8 SHEETS—SHEET 3.

WITNESSES
A.G. Pieczentkowski.
Andrew J. Peters

INVENTOR
Walter H. Coe
BY J. Scholfield
ATTORNEY

No. 799,535. PATENTED SEPT. 12, 1905.
W. H. COE.
MACHINE FOR DEPOSITING METALLIC LEAF IN RIGHT LINES.
APPLICATION FILED JULY 13, 1904.

8 SHEETS—SHEET 4.

WITNESSES
A. G. Pieczentkowski.

INVENTOR
Walter H. Coe
per S. Scholfield
ATTORNEY

No. 799,535. PATENTED SEPT. 12, 1905.
W. H. COE.
MACHINE FOR DEPOSITING METALLIC LEAF IN RIGHT LINES.
APPLICATION FILED JULY 18, 1904.

8 SHEETS—SHEET 5.

WITNESSES
A. G. Pieczenthowski.
Andrew J. Pitcher

INVENTOR
Walter H. Coe
per S. Scholfield
ATTORNEY

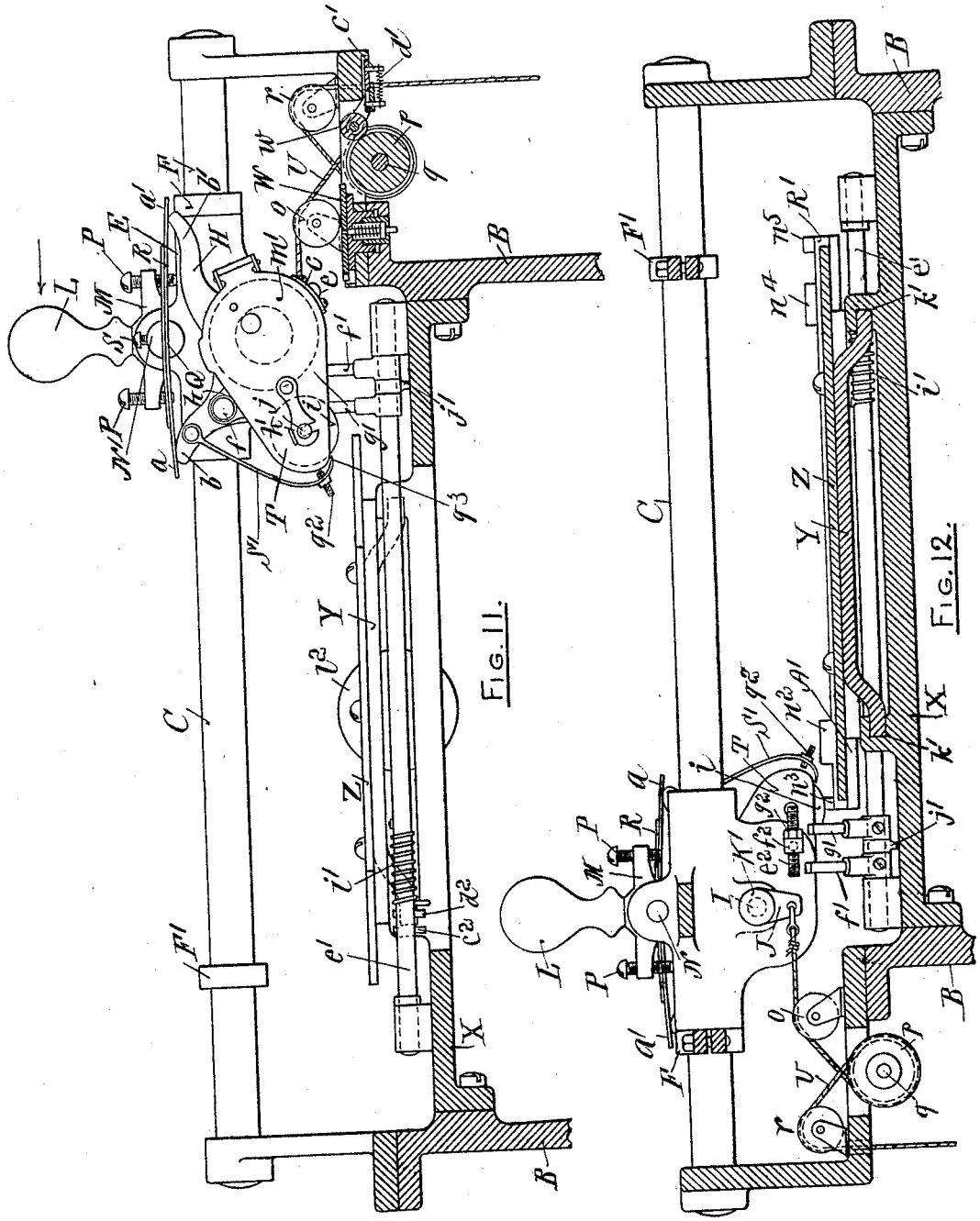

No. 799,535. PATENTED SEPT. 12, 1905.
W. H. COE.
MACHINE FOR DEPOSITING METALLIC LEAF IN RIGHT LINES.
APPLICATION FILED JULY 18, 1904.

8 SHEETS—SHEET 7.

WITNESSES
A.G. Pieczenthowski.
Andrew J. Pitcher

BY

INVENTOR
Walter H. Coe
S. Scholfield
ATTORNEY

No. 799,535. PATENTED SEPT. 12, 1905.
W. H. COE.
MACHINE FOR DEPOSITING METALLIC LEAF IN RIGHT LINES.
APPLICATION FILED JULY 18, 1904.

8 SHEETS—SHEET 8.

WITNESSES
A.G. Pieczentkowski.
Andrew J. Pitchn

INVENTOR
Walter H. Coe
By J. Scholfield
ATTORNEY

UNITED STATES PATENT OFFICE.

WALTER H. COE, OF PROVIDENCE, RHODE ISLAND.

MACHINE FOR DEPOSITING METALLIC LEAF IN RIGHT LINES.

No. 799,535. Specification of Letters Patent. Patented Sept. 12, 1905.

Application filed July 18, 1904. Serial No. 217,128.

*To all whom it may concern:*

Be it known that I, WALTER H. COE, a citizen of the United States, residing at Providence, in the State of Rhode Island, have invented a new and useful Improvement in Machines for Depositing Metallic Leaf in Right Lines, of which the following is a specification.

My invention relates to a machine for depositing gold or other metallic leaf in right lines from a spirally-wound package-roll; and my invention consists in the employment of a rotating and reciprocating table in combination with a guiding-track, and a carriage provided with a depositing-arm.

Figure 1:
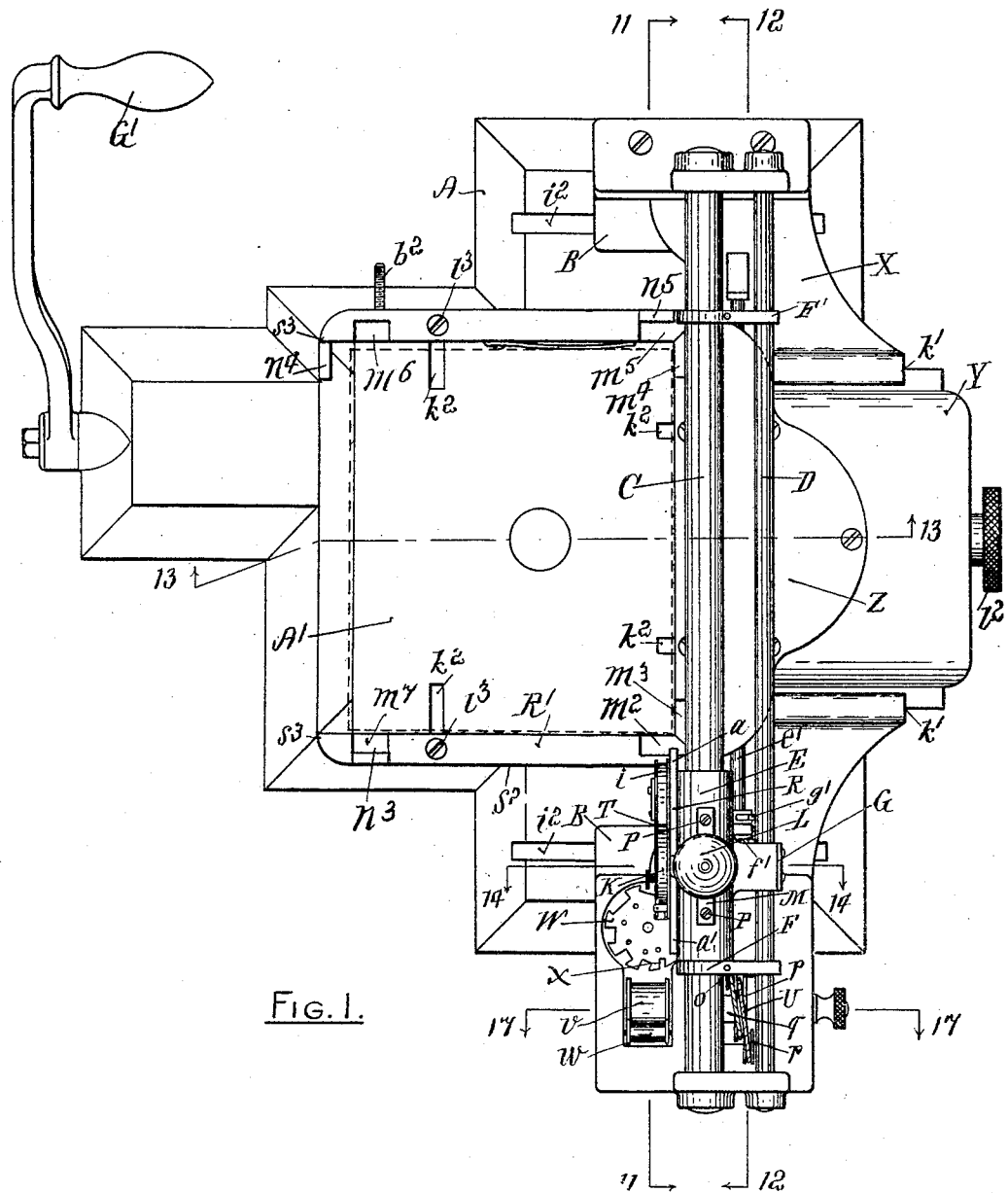
Figure 2:
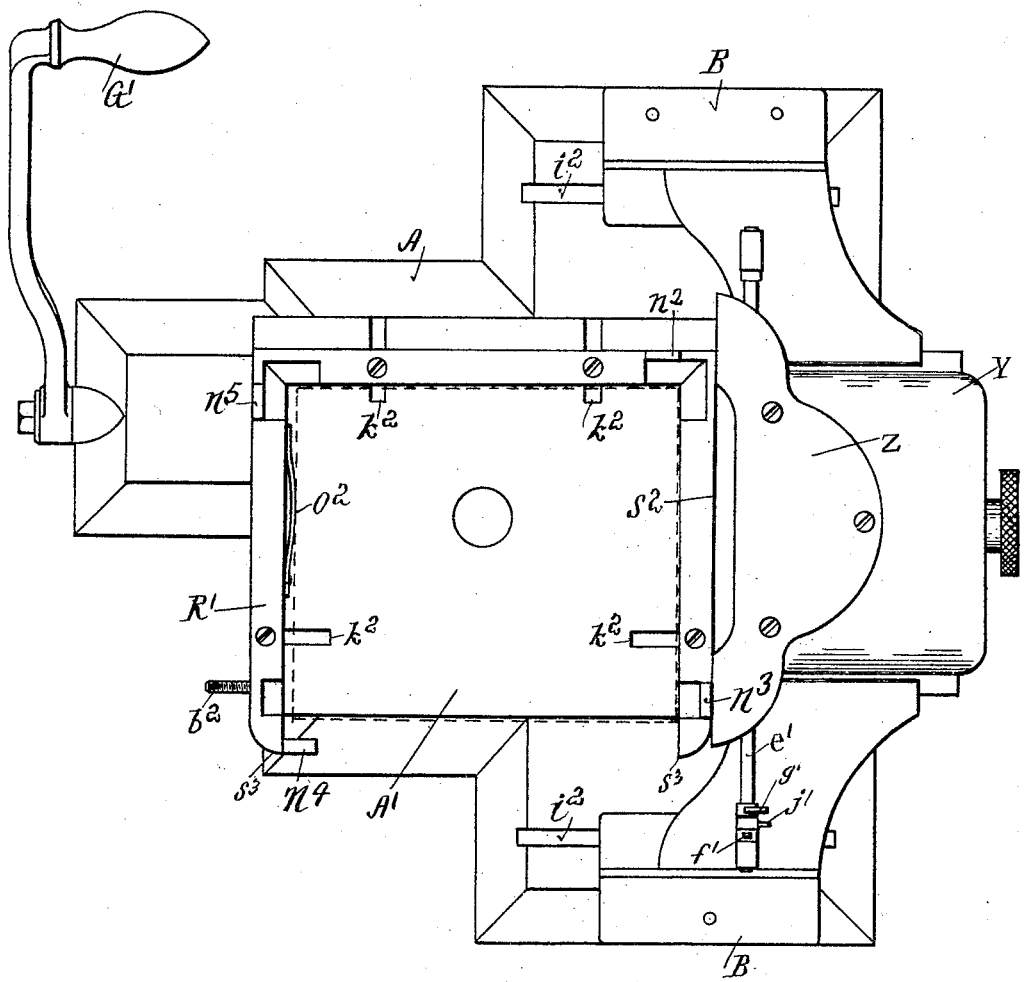
Figure 3:
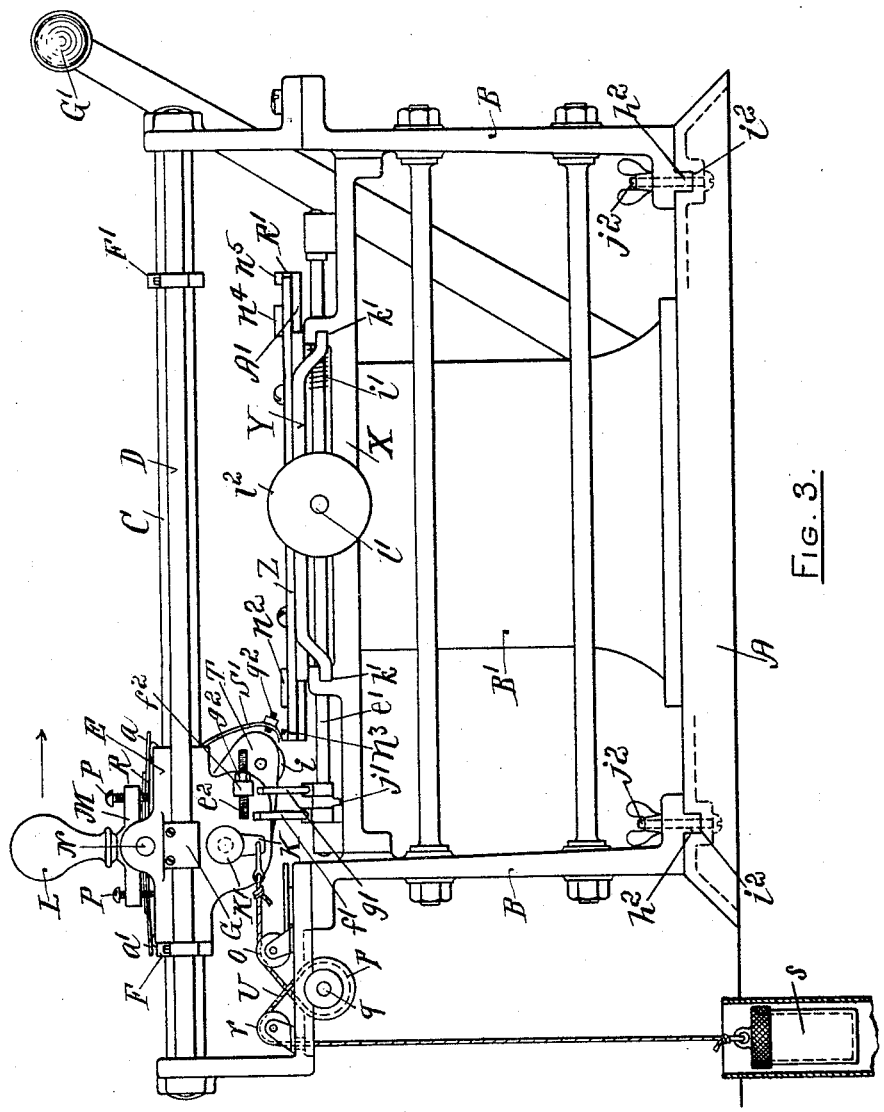
Figures 4, 5, 6:
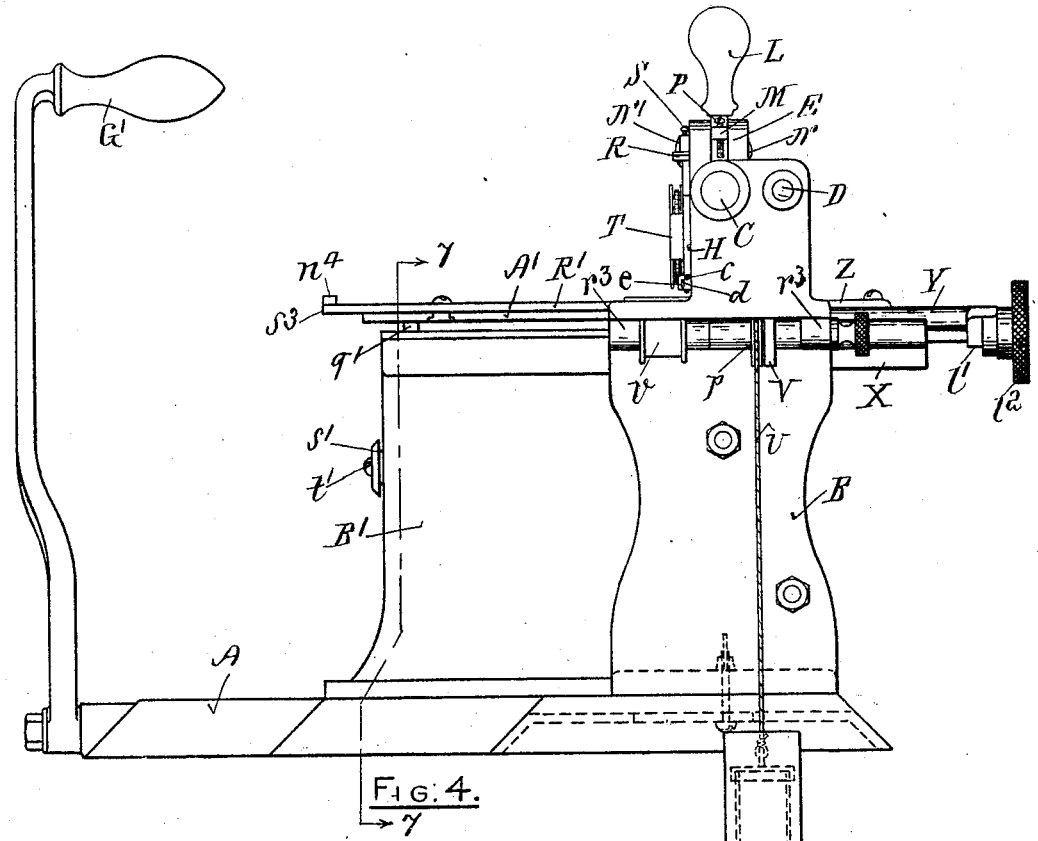
Figures 7, 8:
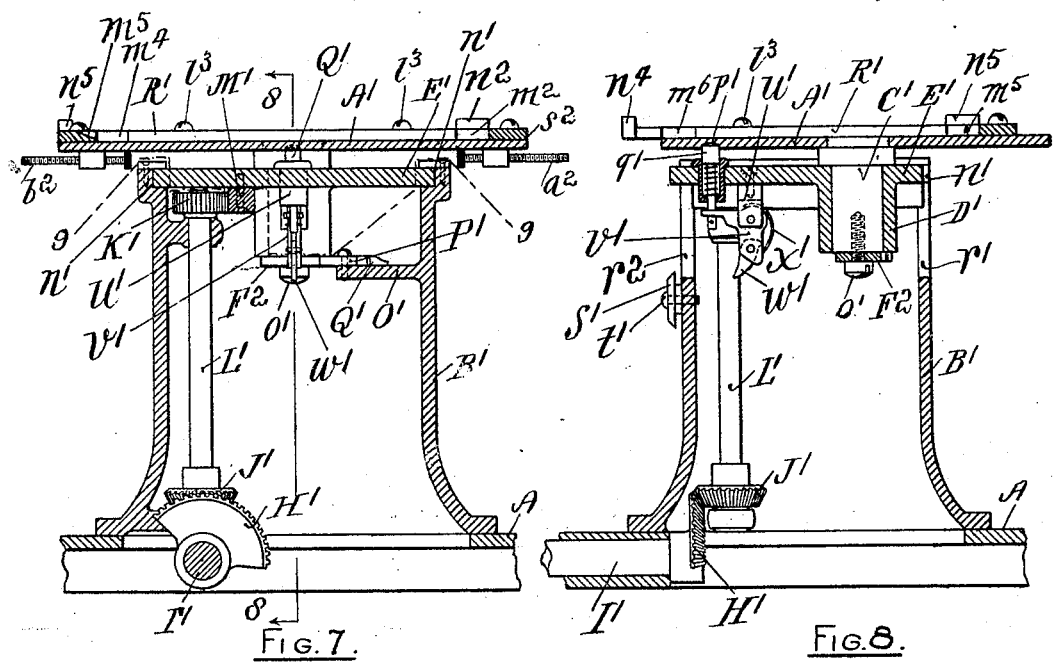
Figure 9:
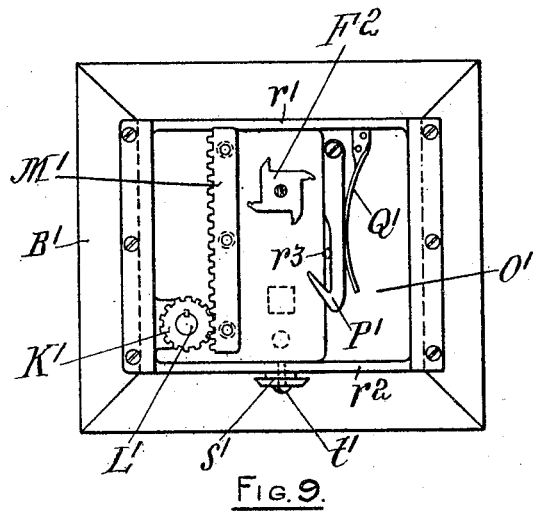
Figure 10:
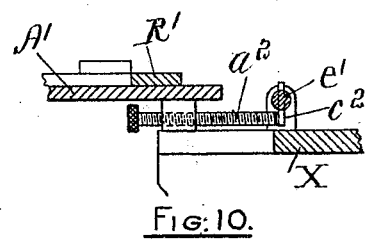
Figure 13:
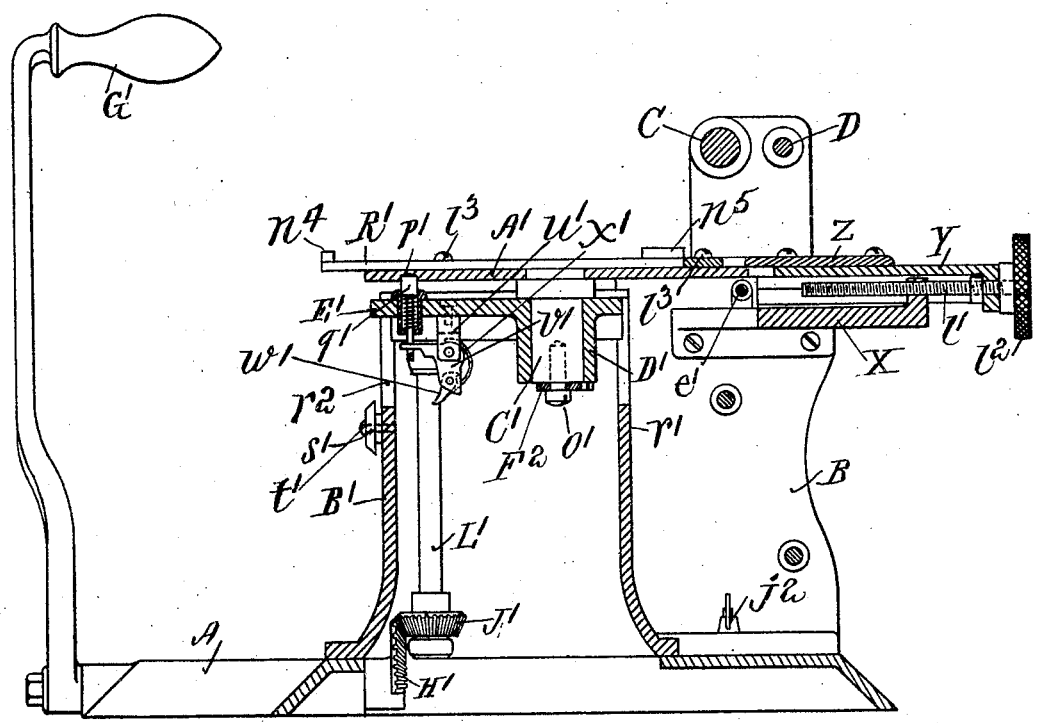
Figure 14:
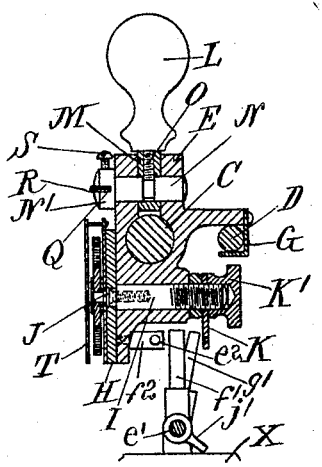
Figure 15:
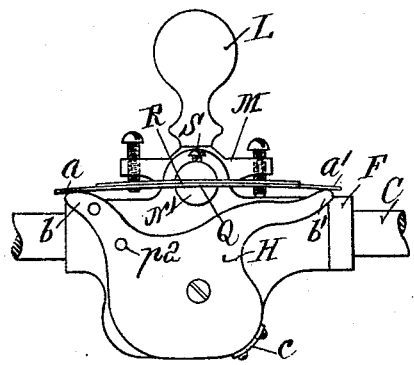
Figure 16:
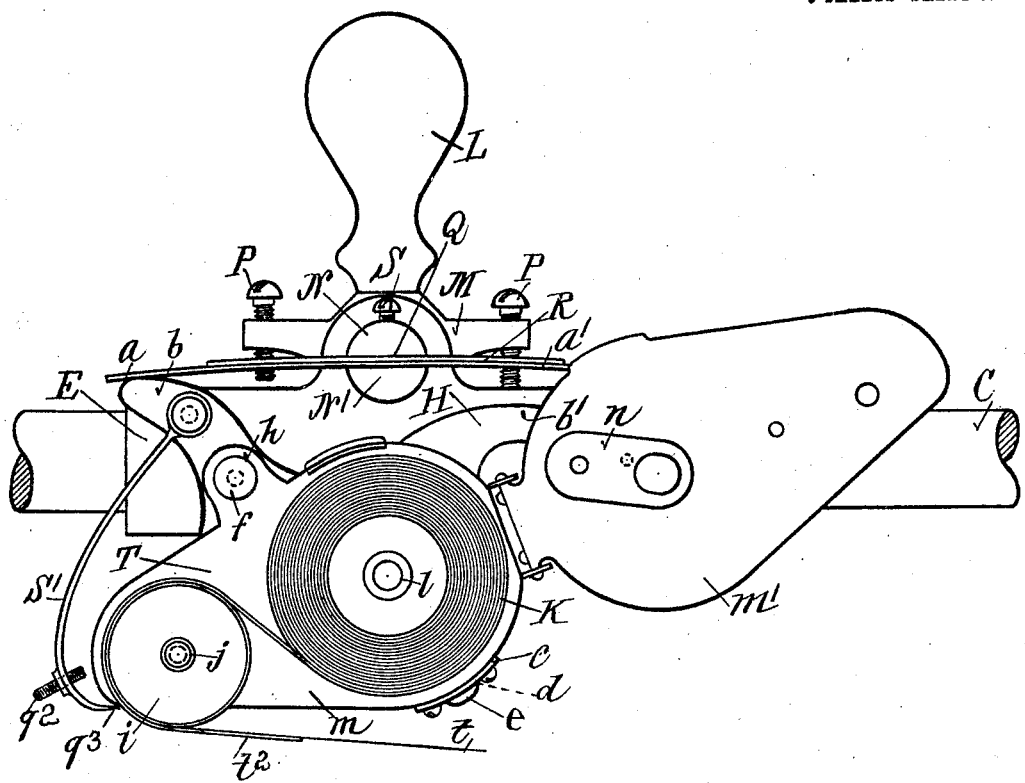
Figures 17, 18:
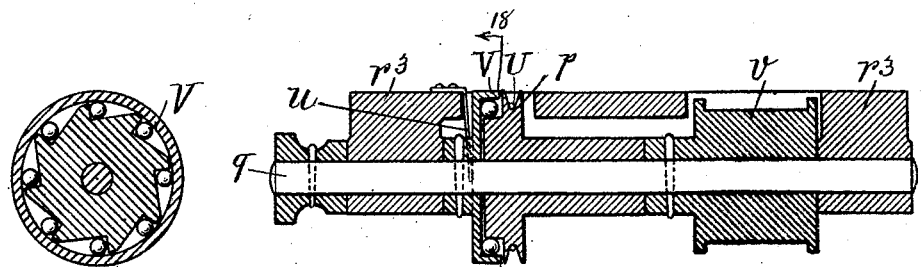
Figure 19:
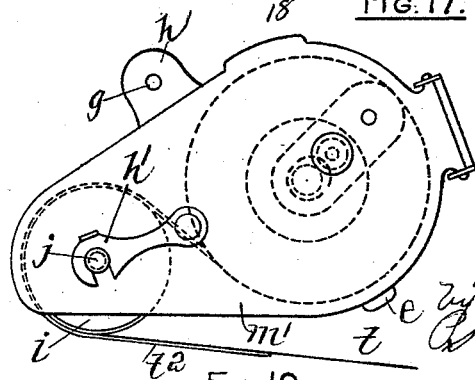

In the accompanying drawings, Figure 1 represents a top view of the complete machine. Fig. 2 represents a top view with the guiding-track and the carriage removed and the holding-table turned to the proper position for commencing the work upon a book-cover, which is indicated by dotted lines. Fig. 3 represents a side view. Fig. 4 represents an end view with the holding-table in the position shown in Fig. 1. Fig. 5 represents a top view of the table and the line-guide attached to the table. Fig. 6 represents a section taken in the line 6 6 of Fig. 5. Fig. 7 represents a section taken in the line 7 7 of Fig. 4. Fig. 8 represents a section taken in the line 8 8 of Fig. 7. Fig. 9 represents a section taken in the line 9 9 of Fig. 7. Fig. 10 represents an enlarged detail section. Fig. 11 represents an enlarged vertical section taken in the line 11 11 of Fig. 1. Fig. 12 represents an enlarged vertical section taken in the line 12 12 of Fig. 1. Fig. 13 represents a vertical section taken in the line 13 13 of Fig. 1. Fig. 14 represents an enlarged section taken through the sliding carriage in the line 14 14 of Fig. 1. Fig. 15 represents a side view of the carriage with the depositing-arm removed. Fig. 16 represents an enlarged side view of the sliding carriage, showing the depositing-arm in its opened condition. Fig. 17 represents an enlarged section taken in the line 17 17 of Fig. 1. Fig. 18 represents a transverse section taken in the line 18 18 of Fig. 17. Fig. 19 represents an enlarged side view of the depositing-arm separate from the machine.

In the drawings, A represents the foundation bed-plate of the machine, and B B the upright standards of an adjustable frame, which serves to support the guiding-track for the carriage, the said track being formed of the parallel bars C and D, upon which is placed the sliding carriage E, which is adapted for movement back and forth between the adjustable stops F F'. The carriage E is held to the bar D by means of the angle-piece G, and at the side of the carriage E is loosely held the rocking plate H, the said plate being secured to the end of the rock-shaft I by means of the screw J, and to the opposite end of the said rock-shaft is secured the pendent arm K by means of the nut K'. The handle L, by means of which the sliding carriage E is actuated, is attached to the rocking piece M, which is secured to the shaft N by means of the screw O of the handle L, the extent of the rocking movement of the handle L and shaft N being regulated by means of the adjusting-screws P P. The head N' of the rocking shaft N is provided with the diametrical slot Q, in which is secured the flat spring R, the said spring being firmly held in said slot by means of the set-screw S. The opposite arms $a$ and $a'$ of the spring R bear upon the corresponding opposite arms $b$ and $b'$ of the rocking plate H, and by means of the said arm $a$ of the spring R the desired yielding movement may be imparted from the handle L to the rocking plate H.

The removable depositing-arm T is secured to the rocking plate H by means of the locking-piece $c$, which projects laterally from the lower edge of the plate H, to which it is attached, and is provided with a slot $d$, the said slot being adapted to receive the projecting lug $e$ of the inner side $m$ of the depositing-arm T, the said inner side of the depositing-arm being also fastened to the rocking plate by means of the knurled screw $f$ passing through a perforation $g$, made in the ear $h$, and screwing into a threaded perforation $p^2$ in the said rocking plate. The delivering-roller $i$ of the depositing-arm is held to rotate upon the stud $j$, which projects from the side $m$, and the package-roll K is held to rotate upon the stud $l$, the outer side $m'$ of the depositing-arm being hinged to the inner side $m$ and held in its closed position by means of the hook $h'$, and a flat spring $n$ is arranged to properly friction the side of the package-roll K for unwinding movement.

To the pendent arm J of the rock-shaft I is secured the end of the cord U, which passes from the arm J over the idler-pulley $o$, thence around the pulley $p$, which is loose on the shaft $q$, and thence over the idler-pulley $r$ to connection with the weight $s$, whereby the pulley $p$ and shaft $q$ will be rotated at the backward movement of the carriage. The pulley $p$ is provided with a ball-clutch V, by means of which the shaft $q$, which is supported in the bearings $r^3$ $r^3$, is caused to rotate in the proper direction for taking up the paper strip $t$, after the metallic leaf $t^2$ has been deposited therefrom, and the shaft $q$ is frictioned by means of the friction-spring $u$ to prevent the backward movement of the shaft upon the forward movement of the carriage. At the back of the take-up roll $v$ is placed the pressure-roll $w$, which serves to hold the paper strip $t$ in frictional engagement with the surface of the roll $v$ to draw the strip backward upon the occasion of the backward movement of the carriage E. The pressure-roll $w$ is held upon a sliding frame $c'$, which is actuated in the forward direction by means of the spring $d'$, and a rotatable guide-plate W is provided for operating with package-rolls of different widths, the paper strip from the package-roll being caused to pass downward to the take-up roll $v$ through one of the guide-notches $x$ of the guide-plate when the said notch is properly arranged with reference to the take-up roll.

Upon the tie-plate X, which connects the upper ends of the upright standards B B, is journaled the rock-shaft $e'$, upon which are placed the adjustable stop-pins $f'$ and $g'$, which serve to limit the backward movement of the carriage E, as occasion may require, and upon the rock-shaft $e'$ is placed the torsion-spring $i''$, and a stop-arm $j''$ is provided to limit the outward movement of the stop-pins $f'$ and $g'$ under the torsional action of the spring, as shown in Fig. 14. The tie-plate X is also provided with the guideways $k'$ $k'$, in which is placed the slide Y, made adjustable by means of the screw $l'$, provided with the milled head $l^2$, and upon the slide Y is secured the gage-plate Z.

The rotating table A', upon which the book-cover or other similar article upon which the work is to be performed is placed, is supported in an elevated position by means of the hollow standard B', the said table being provided with a downwardly-extending journal C', which is held in the hub D' of the slide E', which latter is held in the guideways $n'$ $n'$, and to the lower end of the journal C' is secured the four-armed star-wheel F² by means of the screw $o'$. The underside of the table A' is provided with the four slight recesses $p'$, into one of which the rounded end of the spring-actuated bolt $q'$ passes at each partial revolution of the table, thus serving to hold the table in its proper position for movement toward the gage-plate Z preparatory for depositing a line of gold-leaf upon the book-cover. Forward and backward movement is imparted to the slide from the handle G' by means of the bevel-gear segment H' upon the horizontal shaft I', the bevel-gear J', and spur-gear K' upon the upright shaft L' and the rack M', secured to the under side of the slide E'. Upon the shelf O' is pivoted the catch P', against which the spring Q' is made to act, the forward movement of the said catch being limited by means of the stop-pin $r^3$. The supporting-standard B' is cut away at the sides $r'$ and $r^2$, and at the outer side $r^2$ is secured the engaging piece $s'$ by means of the screw $t'$. To the fixed support $u'$, extending downward from the slide E', is pivoted the bell-crank lever $v'$, which is adapted to draw the bolt $q'$ downward to release the table A' preparatory to its rotation, the lower end of the said bell-crank lever $v'$ being provided with the pivoted catch $w'$, which is held in its engaging position by means of the spring $x'$.

At the under side of the table A' are placed the adjustable engaging screws $a^2$ and $b^2$, the said screws by engagement with the pins $c^2$ and $d^2$, which project downward from the rock-shaft $e'$, serving to place the stop-pins $f'$ and $g'$ in proper position for limiting the backward movement of the carriage, as the case may require. The engaging screw $e^2$ is secured to the rear side of the carriage E by means of the post $f^2$ and check-nut $g^2$, the end of the said screw being adapted for engagement with the side of the stop-pins $f'$ and $g'$ for properly limiting the movement of the carriage. The standards B B of the track-carrying frame are each provided with a rib $h^2$, which slides in a corresponding groove $i^2$, made in the bed-plate A of the machine, as shown in Fig. 3, and by means of the ribs $h^2$ and grooves $i^2$ and the clamping-screws $j^2$ the track-carrying frame may be adjusted relatively to the working position of the table, so that book-covers or other similar articles of different sizes may be operated upon successfully.

The holding-table A' is provided with the slot-openings $k^2$ $k^2$, as shown in Fig. 5, and the line-guide R' is secured to the said table by means of the screws $l^3$ $l^3$, the said line-guide being provided with the beveled surfaces $m^2$, $m^3$, $m^4$, $m^5$, $m^6$, and $m^7$, which serve to allow the delivering-roller of the depositing-arm to drop to the surface upon which the metallic leaf is to be deposited, and with the upwardly-projecting stops $n^2$, $n^3$, $n^4$, and $n^5$ and also with the light spring $o^2$. To the side of the forward arm $b$ of the rocking plate H is secured the spring S', the lower end of which forms a cutting edge $q^3$, which is adapted to sever the metallic leaf upon the paper strip whenever the engaging screw $q^2$ strikes one of the stop projections $n^2$, $n^3$, $n^4$, or $n^5$ of the line-guide R'.

In operating the machine to make a line of gold-leaf at the edge of a book-cover one of the flaps of the said cover is to be placed within the rectangular line-guide R', as shown by the dotted lines in Figs. 1 and 2, and the holding-table A' first turned to the position shown in Fig. 2 and then moved to the right by means of the handle G' until the side $s^2$ of the line-guide R' strikes the bearing-face of the gage-plate Z, and in this case the stop-pin $f'$ will be thrown into proper line for the engagement of the adjustable screw $e^2$ of the carriage E therewith by means of the prior engagement of the adjustable screw $a^2$ of the table A' with the pin $c^2$, which projects downward from the rock-shaft $e'$. Now by bringing the carriage E back toward the operator by means of the handle L until the said screw $e^2$ strikes against the said stop-pin $f'$ the carriage will be in proper position for depositing the line of gold-leaf upon the book-cover with the minimum expenditure of gold-leaf. Then the operator by pressing upon the handle L in the direction indicated by the arrow in Fig. 3 will first rock the delivering-roller $i$ down onto the surface of the book-cover with the desired yielding pressure of the spring-arm $a$, and then the continued movement of the handle L in the same direction will carry the carriage E along the guiding-track, the paper strip $t$ being at the same time firmly held against movement with the carriage by means of the take-up roll $v$, pressure-roll $w$, and the pressure-spring $u$, which serves to frictionally prevent the movement of the shaft $q$, to which the take-up roll $v$ is secured, and upon the continued movement of the carriage E the paper strip and gold-leaf will be unwound from the package-roll, and when the carriage E has reached its proper limit of movement the adjustable engaging screw $q^2$ of the cutting-spring S' will engage with the stop $n^2$ of the line-guide, thus stopping the movement of the carriage and causing the gold-leaf to be either severed or so weakened that it will be readily separated from the paper strip at the indented line upon the initial movement of the rocking handle L in the opposite direction, which movement will first serve to raise the delivering-roller and paper strip from the surface of the book-cover on which the gold-leaf has been deposited, and then upon the initial reverse movement of the carriage E the cord U and weight $s$ will cause the proper engagement of the ball-clutch V, by means of which the rolls $v$ and $w$ will be operated to take up the paper strip. Now upon pulling the handle G' forward the table A' and the attached line-guide R' will first be carried back from contact with the gage-plate Z until the star-wheel $F^2$ engages with the catch P', which engagement will cause the rotation of the table for one-quarter of a revolution, the stop-bolt $q'$ having been previously drawn down out of its stop-recess $p'$ at the under side of the table by the engagement of the spring-actuated catch $w'$ of the bell-crank lever $v'$ with the edge of the engaging piece $s$, the said catch $w'$ passing over and beyond the said engaging piece, and then upon carrying the handle G' back toward its normal position the backwardly-yielding catch $w'$ will pass freely over the edge of the said engaging piece $s'$ and the ends $s^3$ $s^3$ of the line-guide will be brought back to contact with the forward edge of the gage-plate Z, and then upon bringing the carriage E back against the stop F another line of gold-leaf may be deposited upon the cover, the screw $q^2$ of the cutting-spring S' in this case engaging with the upwardly-extending stop $n^3$ of the line-guide to sever the gold-leaf, and upon bringing the handle G' again forward the table and line-guide will be withdrawn from contact with the gage-plate Z and partially rotated, as before, so that now the engaging screw $b^2$ will upon the return movement of the table and line-guide to engagement with the bearing-face of the gage-plate Z strike the pin $d^2$ and throw the stop-pin $g'$ in proper position to properly limit the backward movement of the carriage, and then by bringing the carriage E back to the limiting stop-pin $g'$ another line of gold-leaf may be properly deposited upon the cover, and in this case the screw $q^2$ of the cutting-spring S' will engage with the stop projection $n^4$ of the line-guide to sever the gold-leaf, and upon bringing the handle G' again forward the table and line-guide will be withdrawn from contact with the gage-plate Z, as before, and partially rotated, so that now upon bringing the table and line-guide back to engagement with the gage-plate Z and bringing the carriage back to engagement with the stop F the remaining line of gold-leaf may be deposited on the cover and severed by the engagement of the screw $q^2$ of the cutting-spring with the stop projection $n^5$, after which the finished cover may be removed and another cover placed upon the table and the operation of depositing the lines of gold-leaf repeated.

I do not limit my claim to the particular mechanism shown and described for reciprocating and rotating the holding-table, as other means may be readily employed without departing from the spirit of my invention.

I claim as my invention—

1. The combination of the guiding-track, the carriage adapted for movement along the track, the depositing-arm and the cutter connected with the carriage, and stop means for causing the action of the cutter upon the metallic leaf, at the completion of the forward movement of the carriage.

2. The combination of the guiding-track, the carriage adapted for movement along the track, and the depositing-arm connected with the carriage, with the rotary work-holding table, and means for rotating the table.

3. The combination of the guiding-track, the carriage adapted for movement along the track, and the depositing-arm connected with the carriage, with the rotary work-holding table, and means for rotating and reciprocating the table.

4. The combination of the guiding-track, the carriage adapted for movement along the track, and the depositing-arm connected with the carriage, with the rotating and reciprocating work-holding table, and a limiting-stop for the backward movement of the carriage, said stop being thrown into position by the movement of the table.

5. The combination of the guiding-track, the carriage adapted for movement along the track, and the depositing-arm connected with the carriage, with the rotary work-holding table, means for rotating and reciprocating the table, and stop means for limiting the movement of the table in the direction toward the track.

6. The combination of the guiding-track, the carriage adapted for movement along the track, and the depositing-arm connected with the carriage, with the rotary work-holding table, the line-gage arranged upon the table, and the stop adapted for engagement with the line-gage.

7. The combination of the guiding-track, the carriage adapted for movement along the track, and the depositing-arm connected with the carriage, with the rotary work-holding table, and means for adjusting the guiding-track relatively to the position of the table.

WALTER H. COE.

Witnesses:
SOCRATES SCHOLFIELD,
CHAS. E. SMITH.